United States Patent [19]
Wiese et al.

[11] Patent Number: 5,449,054
[45] Date of Patent: Sep. 12, 1995

[54] ROTARY DAMPER

[75] Inventors: Heiner Wiese, Norderstedt; Roland Klein, Ammersbek, both of Germany

[73] Assignee: ITW-ATECO GmbH, Norderstedt, Germany

[21] Appl. No.: 176,376

[22] Filed: Dec. 30, 1993

[30] Foreign Application Priority Data

Dec. 30, 1992 [DE] Germany .................. 42 44 484.5

[51] Int. Cl.⁶ ............................................. F16D 57/02
[52] U.S. Cl. .................................... 188/296; 74/574; 16/82; 16/319; 188/293; 464/24
[58] Field of Search ............... 16/82, 319; 188/290, 188/293, 294, 296; 192/58 A, 58 R; 74/574, 573 F, 573 R, 572; 464/24, 30

[56] References Cited

U.S. PATENT DOCUMENTS

| | | | |
|---|---|---|---|
| 4,666,386 | 5/1987 | Winkler et al. | 188/290 |
| 5,083,343 | 1/1992 | Lee | 16/82 |
| 5,277,282 | 1/1994 | Umemura | 74/573 F |

FOREIGN PATENT DOCUMENTS 555241  6/1923  France .................. 188/90

Primary Examiner—Charles A. Marmor
Assistant Examiner—David Fenstermacher
Attorney, Agent, or Firm—Schwartz & Weinrieb

[57] ABSTRACT

A rotary damper, in particular for actuated parts in automotive vehicles, comprising a housing including a cylindrical damper chamber, a liquid in the chamber, a rotatably supported shaft in the chamber having at least one vane such that upon rotation of the shaft displaced liquid flows through a flow constriction between the vane and the wall of the chamber, characterized in that the vane is inclined relative to the shaft in the circumferential direction of the shaft and relative to a diameter extending through the base of the vane, and that the vane is adapted to swing relative to the shaft such that upon a rotation of the shaft in one sense the vane is moved towards the chamber wall and upon rotation in the opposite sense the vane is moved towards the shaft.

18 Claims, 2 Drawing Sheets

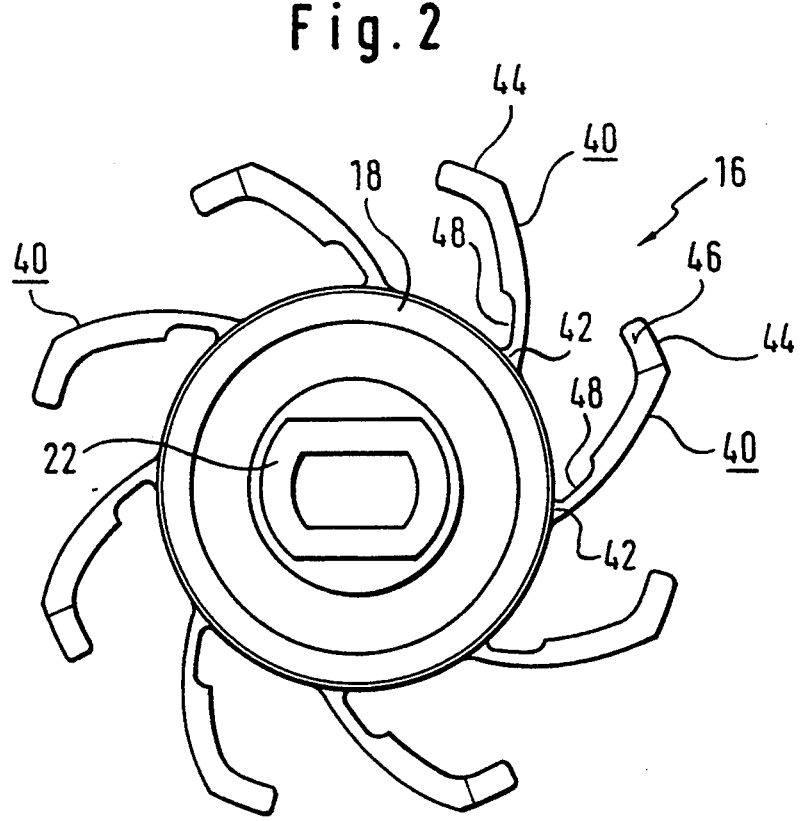
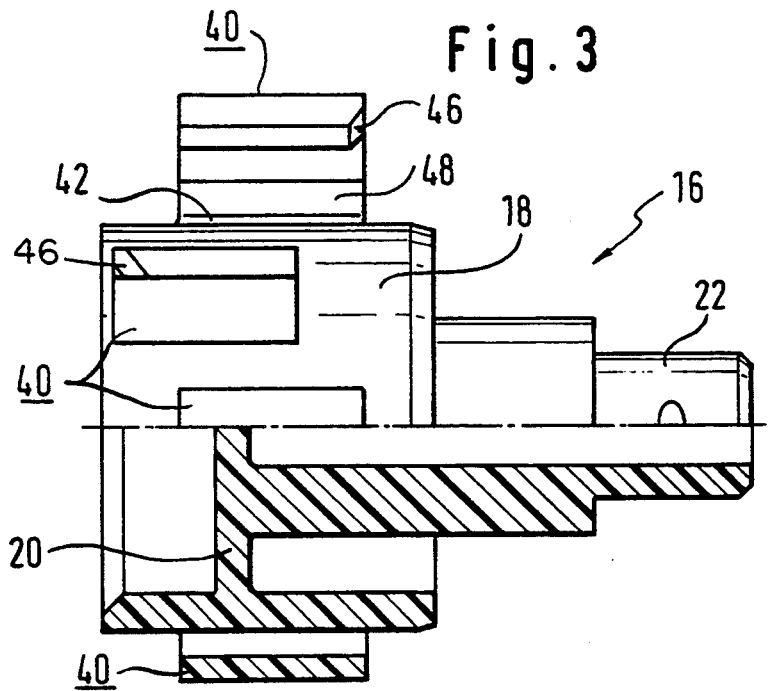

5,449,054

ROTARY DAMPER

FIELD OF THE INVENTION

The present invention relates to a rotary damper, in particular for an actuated part in an automotive vehicle.

BACKGROUND OF THE INVENTION

Many actuated parts for automotive vehicles such as handles, glove compartment covers, ash tray covers or the like are biased into one of a pair of positions by spring means. For example, handles are returned to their rest positions by spring means. Glove compartment covers are moved by spring means into their open positions after a manual unlocking operation. These movements caused by the spring means are suddenly interrupted by abutment means. This may cause the generation of more or less substantial noise.

German Patent Specification 33 16 256 discloses a rotary damper to be used for damping such movements as caused by spring means. A sealed chamber of a housing includes a liquid. A shaft extending from the chamber includes a vane of sector-shaped cross-section. At its periphery the vane has a circular contour conforming to the circular contour of the cylindrical chamber. A radial gap between the vane and the adjacent chamber wall provides a flow restriction through which the liquid is forced to pass when the housing and the shaft are rotated relative to each other.

German Utility Model 87 07 936 discloses a rotary damper having a vane provided with one or a plurality of through-bores through which the liquid flows so as to provide for a braking or dampening effect.

Such rotary dampers can be of very small size and accordingly may be used at locations where the available space is limited. They can be made from simple plastic parts so that manufacturing and assembly expenditure are comparatively low. The prior art rotary dampers are generally constructed so that they have similar dampening characteristics in both directions of rotation. When for example a glove compartment cover is opened by a suitable spring means, the closing thereof has to be performed manually. Accordingly, when a rotary damper as described above is associated with such a glove compartment cover, the closing of the glove compartment is dampened in the same manner as the opening thereof.

OBJECT OF THE INVENTION

It is an object of the present invention to provide a rotary damper, in particular for an actuated part in an automotive vehicle, which has different dampening characteristics in opposite directions of rotation.

SUMMARY OF THE INVENTION

In a rotary damper of the present invention the vane is inclined relative to a diameter line extending through the base of the vane. Furthermore, the vane is pivotal relative to the shaft. As a result the vane is subjected to a pivoting force when the shaft is rotated in the chamber. The direction of such pivotal movement of the vane depends on the direction of rotation. When the shaft is rotated in a direction corresponding to the direction in which the vane is inclined, the vane "stands up" and is pivoted towards the cylindrical wall of the chamber. A space which was present between the vane and said wall is reduced thereby so that a desired substantial brake or dampening force results therefrom. When the shaft is rotated in the opposite direction, the vane is pivoted towards the shaft so that its spacing from the cylindrical chamber wall is increased. As a result thereof, the flow cross-section of the gap between the vane and the chamber wall is increased, and the rotational force in this direction of rotation is reduced or dampened substantially less than in the opposite direction. Accordingly, the rotary damper of the present invention forms a type of a "one-way damper".

In a practical embodiment of the present invention the vane when it is in its inoperative condition extends closely adjacent to the cylindrical chamber wall. A small gap or even some kind of seal will result therefrom. It will then be necessary to provide a through-flow passage means laterally of the vane, through which the displaced fluid may flow when the vane is rotated in the chamber.

It would be possible to pivotally mount the vane to the shaft. However, it is preferred to have the shaft and vane integrally formed of synthetic material. In this case the vane should be provided with a weakened cross-sectional area, preferably adjacent to the base of the vane, which area would form a pivot for the vane.

The vane may have an arched configuration. At its outer end it may have a flattened portion approximately extending perpendicularly to a diameter line extending therethrough.

It would be possible to provide only one vane for the rotary damper. However, it is preferred to have a plurality of vanes mounted on the shaft so as to be uniformly spaced in the circumferential direction. In this case the vanes cannot cooperate with a fixed abutment to limit relative movements between the shaft and housing. Rather separate limiting means acting between the shaft and the housing are required.

When there is provided a plurality of vanes, adjacent vanes can be laterally offset with respect to each other in the circumferential direction. This will result in a serpentine-like or meandering flowpath in a circumferential direction, thus ensuring that fluid flow will be uninterruped.

BRIEF DESCRIPTION OF THE DRAWINGS

Various other objects, features, and attendant advantages of the present invention will be more fully appreciated from the following detailed description, when considered in connection with the accompanying drawings, in which like reference characters designate like or corresponding parts thereof, and wherein:

FIG. 2 is an end view of the shaft of the rotary damper in FIG. 1;

FIG. 3 is a side elevational view, partly in cross-section, of the shaft of FIG. 2.

DETAILED DESCRIPTION OF THE ILLUSTRATED EMBODIMENT

Figure 1:
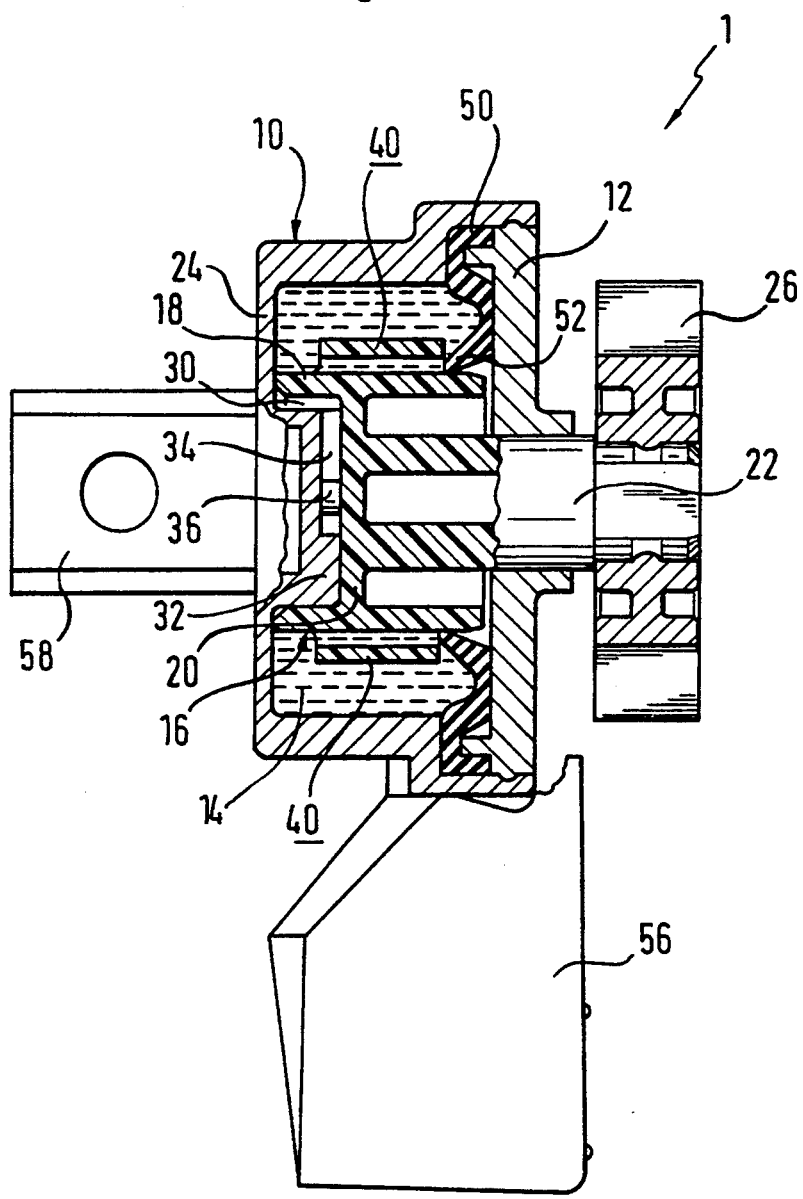
FIG. 1 is a cross-sectional view of a rotary damper in accordance with the present invention.

With reference to FIG. 1, rotary damper 1 comprises a cup-shaped housing 10 which is closed at its normallly open end by a cover 12 in a fluid-tight manner. The housing 10 contains a liquid 14 such as silicone oil. The housing 10 receives a rotor 16 having a cylindrical portion 18 which is connected to a shaft 22 by means of radial portion 20 intermediate its ends. The cylindrical portion 18 extends over substantially the whole length between the bottom or opposite end 24 of the cup-shaped housing 10 and the cover 12. The shaft 22 extends through a central opening of the cover 12. A gear 26 is mounted upon an external portion of shaft 22 so as to be rotatable therewith. The opposite side of radial portion wall 20 includes a recess 30 for receiving an axial extension 32 of the housing 10. The extension 32 is provided at its end with a recess 34 for receiving a pin 36 of wall 20. The recess 34 and the pin 36 provide means for limiting rotation of rotor 16.

At the periphery of the cylindrical portion 18 of shaft 22 there is provided a plurality of vanes 40.

The shape of the vanes is best shown in FIG. 2. The vanes 40 are of slightly arcuate shape and are inclined with respect to a diameter line extending through base 42 so as to extend towards one direction of rotation (counterclockwise in FIG. 2). The vanes have radially outer end portions of increased curvature, which at their outer sides are provided with flattened portions 44 in close relationship to the cylindrical wall of the chamber provided by the cup-shaped housing 10. Adjacent vanes 40 are lateraly offset with respect to each other as may be seen from FIG. 3. The ends of the vanes 40, at their lateral sides, are provided with chamfers or obligue surface portions 46 which alternate with each other on opposite sides. The chamfers 46 provide for a serpentine-like or meandering flow path for the fluid flow between the vanes 40 when the rotor 16 is rotated in housing 10.

The vanes 42 and the rotor 16 are integral and formed of synthetic material or plastic. The vanes 40 are provided with weakened areas 48, that is areas of reduced cross-section, adjacent their base 42. The weakened portions 48 allow for pivoting of the vanes 40 towards the cylinder portion 18 or the rotor 16 when the rotor 16 is rotated clockwise with respect to FIG. 2. From this results an increased flow passage between the free ends of the vanes 40 and the cylindrical wall of the chamber so that the rotor may be rotated relatively easily. When the rotor is rotated in the opposite direction, the only flow path available for the liquid is the above described flow path laterally of the vanes 40 so that the shaft will experience a substantial drag.

A seal 50 is provided between the housing 10 and the cover 12. The seal 50 is held stationary by the cover 12 and has an annular sealing lip 52 engaging the outer surface of the cylindrical portion 18 of the rotor 16 so as to prevent the liquid 14 from flowing to the cover 12 and leak from the housing 10. The housing 10 is provided with a mounting portion 56 for mounting the housing 10 to a member or other means (not shown). A substantially axial extension 58 of the housing 10 serves the same purpose.

Many modifications and variations are possible in light of the above teachings. It is therefore to be understood that within the scope of the appended claims, the present invention may be practiced otherwise than as specifically described herein.

We claim:

1. A rotary damper, comprising:
   a housing defining a cylindrical damping chamber;
   a damping liquid disposed within said damping chamber;
   a rotary shaft disposed within said damping chamber and immersed within said damping liquid diposed within said damping chamber;
   means defined between said housing and said rotary shaft for limiting rotation of said rotary shaft to less than one revolution with respect to said housing;
   a plurality of substantially radial vanes mounted upon said rotary shaft in a circumferential array about said rotary shaft and wherein each one of said plurality of vanes is inclined with respect to a diametrical plane passing through said rotary shaft and the point of connection of each one of said plurality of vanes and said rotary shaft; and
   means for pivotably mounting said plurality of vanes upon said rotary shaft such that upon rotation of said rotary shaft, and said plurality of vanes mounted thereon, in a first direction, and through an angular movement which is less than one revolution, the inclination of said plurality of vanes will increase such that a distal end portion of each one of said plurality of vanes will be disposed closer to said housing defining said cylindrical damping chamber so as to define with said housing a flow restriction for said damping liquid whereby damped rotation of said rotary shaft is achieved, whereas upon rotation of said shaft and said plurality of vanes mounted thereon in a second opposite direction, through an angular movement which is less than one revolution, the inclination of said plurality of vanes will decrease such that said distal end portion of each one of said plurality of vanes will be disposed closer to said rotary shaft such that increased flow of said damping liquid, between said distal end portions of said plurality of vanes and said housing defining said cylindrical damping chamber, will be permitted whereby undamped rotation of said rotary shaft is achieved.

2. The rotary damper of claim 1, wherein:
   in said operative damped rotation state, said vanes extend approximately up to said housing defining said cylindrical damping chamber.

3. The rotary damper of claim 1, wherein said shaft and said vanes are integrally formed of synthetic material.

4. The rotary damper of claim 3, wherein each one of said vanes has a weakened cross-sectional area adjacent to said base so as to permit said pivotal movement of said vanes with respect to said rotary shaft.

5. The rotary damper of claim 1, wherein each one of said vanes has an arched configuration.

6. The rotary damper of claim 5, wherein at the outer end 1 each of said vanes has a flattened portion extending substantially perpendicular to a diameter extending therethrough.

7. The rotary damper of claim 1, wherein said plurality of vanes mounted on said shaft are uniformly spaced in the circumferential direction.

8. Thee rotary damper of claim 7, wherein said vanes adjacent to each other in the circumferential direction are laterally offset with respect or each other.

9. The rotary damper of claim 7, wherein the ends of said vanes have alternating oblique surface portions at the outer sides thereof.

10. The rotary damper as set forth in claim 1, wherein:
   said damping liquid comprises silicone oil.

11. The rotary damper as set forth in claim 1 wherein:
   said plurality of vanes comprises eight vanes circumferentially disposed about said rotary shaft.

12. The rotary damper as set forth in claim 4, wherein:
   said weakened cross-sectional area of each one of said plurality of vanes comprises an area of reduced cross-section.

13. The rotary damper as set forth in claim 1 wherein:
said rotary shaft comprises a cylindrical portion annularly surrounding and integrally connected to said rotary shaft; and
said plurality of vanes are integrally connected to said annular cylindrical portion of said rotary shaft.

14. The rotary damper as set forth in claim 13, wherein:
said housing has a substantially cup-shaped configuration comprising a closed end wall and an open end disposed opposite said closed end wall; and
a cover member sealingly closes said open end of said housing.

15. The rotary as set forth in claim 14, wherein:
said cylindrical portion of said rotary shaft is integrally connected to said rotary shaft by a radial wall portion disposed intermediate opposite ends of said annular cylindrical portion such that a first recess is defined between said radial wall portion of said rotary shaft and an end of said annular cylindrical portion which is disposed opposite said closed end wall of said housing; and
said closed end wall of said housing comprising an axial extension disposed within said first recess of said rotary shaft.

16. The rotary damper as set forth in claim 15, wherein said means for limiting rotation of said rotary shaft comprises:
a second recess defined within a surface of said axial extension of said closed end wall of said housing which is disposed opposite said radial wall portion of said rotary shaft; and
said radial wall portion of said rotary shaft comprises a pin diposed within said second recess of said axial extension of said closed end wall of said housing.

17. The rotary damper as set forth in claim 15, wherein:
an end portion of said rotary shaft disposed opposite said first recess projects outwardly through said cover member which sealingly closes said open end of said housing; and
a gear is mounted upon said end portion of said rotary shaft which projects outwardly through said cover member for rotating said rotary shaft.

18. The rotary damper as set forth in claim 1, further comprising:
means mounted upon said housing for fixedly supporting said housing upon one of an automotive vehicle handle assembly, a glove compartment assembly, or an ash tray assembly.

* * * * *